US007165643B2

(12) United States Patent
Bozem et al.

(10) Patent No.: US 7,165,643 B2
(45) Date of Patent: Jan. 23, 2007

(54) INDUSTRIAL TRUCK HAVING INCREASED STATIC/QUASI-STATIC AND DYNAMIC TIPPING STABILITY

(75) Inventors: Gerhard Bozem, Heinrichsthal (DE); Andreas Carlitz, Stolberg (DE); Bernhard Götz, Aschaffenburg (DE); Jürgen Roth, Niedernberg (DE); Frank Schröder, Obernburg (DE)

(73) Assignee: Linde Aktiengesellchaft, Wiesbaden (DE)

( * ) Notice: Subject to any disclaimer, the term of this patent is extended or adjusted under 35 U.S.C. 154(b) by 0 days.

(21) Appl. No.: 11/100,354

(22) Filed: Apr. 6, 2005

(65) Prior Publication Data

US 2005/0281650 A1 Dec. 22, 2005

(30) Foreign Application Priority Data

Apr. 7, 2004 (DE) ..................... 10 2004 017 057

(51) Int. Cl.
*B62D 61/12* (2006.01)
*B62D 51/04* (2006.01)

(52) U.S. Cl. ...................... 180/209; 180/19.2; 414/636

(58) Field of Classification Search ................ 280/755, 280/209; 18/19.2, 19.1; 414/636, 634, 635, 414/273; 187/222, 224; 701/50
See application file for complete search history.

(56) References Cited

U.S. PATENT DOCUMENTS

| | | | | |
|---|---|---|---|---|
| 4,411,582 | A * | 10/1983 | Nakada | 414/636 |
| 4,509,127 | A | 4/1985 | Yuki et al. | |
| 4,511,974 | A * | 4/1985 | Nakane et al. | 414/634 |
| 5,011,358 | A * | 4/1991 | Andersen et al. | 414/273 |
| 5,088,879 | A * | 2/1992 | Ranly | 414/636 |
| 5,749,696 | A * | 5/1998 | Johnson | 414/635 |
| 6,056,501 | A * | 5/2000 | Ishikawa et al. | 280/755 |
| 6,170,341 | B1 * | 1/2001 | Avitan | 73/862.392 |
| 6,398,480 | B1 * | 6/2002 | Baginski et al. | 414/635 |
| 6,611,746 | B1 * | 8/2003 | Nagai | 701/50 |
| 6,785,597 | B1 * | 8/2004 | Farber et al. | 701/50 |
| 2004/0031628 | A1 | 2/2004 | Schiebel et al. | |
| 2004/0031649 | A1 | 2/2004 | Schiebel et al. | |
| 2005/0102081 | A1 * | 5/2005 | Patterson | 701/50 |

FOREIGN PATENT DOCUMENTS

| | | |
|---|---|---|
| DE | 29 09 667 | 9/1980 |
| EP | 0 343 839 | 11/1989 |
| EP | 1 078 878 | 8/2001 |
| EP | 1 019 315 | 8/2002 |
| WO | WO 2004/009396 A1 | 1/2004 |
| WO | WO 2004/069568 A1 | 8/2004 |

* cited by examiner

*Primary Examiner*—Hau Phan
(74) *Attorney, Agent, or Firm*—The Webb Law Firm

(57) ABSTRACT

A forward-control counterweight fork-lift truck has a liftable and tiltable load-lifting device (1), a traction drive, operating drives, and a steering drive. A calculation model (D) based on vehicle-specific information is stored in a control device (SE). A plurality of sensors (S) detect physical variables (V, R, H, M, L, WM, WL, BL, BQ, G) relevant to the tipping behavior of the industrial truck. The control device (SE) determines a driving and load state (Z) based on the detected physical variables (V, R, H, M, L, WM, WL, BL, BQ, G) and the stored calculation model (D) and is operatively connected to the traction drive, the operating drives, and the steering drive such that, depending on the driving and load state (Z) determined, corrective interventions (K1, K2) which maintain or increase the tipping stability can be carried out.

13 Claims, 2 Drawing Sheets

INDUSTRIAL TRUCK HAVING INCREASED STATIC/QUASI-STATIC AND DYNAMIC TIPPING STABILITY

CROSS-REFERENCE TO RELATED APPLICATION

This application claims priority to German Application No. 10 2004 017 057.6 filed Apr. 7, 2004, which is herein incorporated by reference in its entirety.

BACKGROUND OF THE INVENTION

1. Field of the Invention

The invention relates to an industrial truck, in particular a forward-control counterweight fork-lift truck, having a liftable and tiltable load-lifting device, a traction drive, operating drives for movement of the load-lifting device, and a steering drive.

2. Technical Considerations

In the case of known industrial trucks, the operator has to estimate the weight of the load goods to be lifted (lifting load) and the height to which the load goods are lifted (lifting height). On the basis of this, the driving speed and the turning radius of the industrial truck must be set such that there is no tipping of the industrial truck to the front or to the side. This demanding task may be too much for the operator and, thus, when the load-bearing capacity of the industrial truck is exceeded or in the event of driving maneuvers which are not adapted to the current lifting load and lifting height, tipping accidents may result involving severe injury or death to the operator or nearby people associated with a high level of damage to property. There has, therefore, been no shortage of thought given to creating suitable safety precautions for preventing accidents involving industrial trucks.

DE 29 09 667 C3, for example, describes a generic industrial truck with which there is intervention in the traction drive, depending on the steering angle, the lifting height, and the load torque, and, in the process, the driving speed and, if necessary, also the (electromotive) braking deceleration is limited. This takes place by overriding the desired values predetermined by the operator, using correction signals from the control device.

The subject matter of EP 0 343 839 B1 is an industrial truck in which the driving speed is limited depending on the lifting load, the lifting height, the steering angle, the direction of travel, and the position of the center of gravity of the vehicle. In addition, provision is also made for limiting the acceleration of the industrial truck depending on the lifting height.

EP 1 078 878 A1 discloses the concept of limiting the tilting speed of an industrial truck lifting mast depending on the lifting load and the lifting height.

Finally, EP 1 019 315 B1 discloses an industrial truck in which the driving speed is limited depending on the lifting load and the tilting angle, and a higher lowering speed without a load is made possible.

One common factor with all of the proposals is the fact that in each case only partial aspects of the operating behavior of the industrial truck are taken into consideration, and, as a result, operating states remain in which there is a considerable risk of tipping.

The present invention is, therefore, based on the object of providing an industrial truck of the general type mentioned above but which has good tipping stability in, if possible, all driving states which are critical in terms of tipping.

SUMMARY OF THE INVENTION

This object is achieved according to the invention by a calculation model, which is based on vehicle-specific information, for the static and/or quasi-static and the dynamic tipping behavior of the industrial truck being stored in a control device, to which a plurality of sensors are connected for the purpose of detecting physical variables which are relevant to the static and/or quasi-static and the dynamic tipping behavior of the industrial truck. The control device is designed to determine a driving and load state which is based on the detected physical variables and the stored calculation model. The control device is operatively connected to the traction drive, the operating drives, and the steering drive such that, depending on the driving and load state determined, corrective interventions which maintain or increase the tipping stability can be carried out.

A concept of the invention accordingly includes intervening, with the help of logic which is implemented by a control device and covers both the operating state "static and/or quasi-static tipping" (given a high lifting height and a low driving speed or standstill) and the operating state "dynamic tipping" (high transverse acceleration when cornering, high longitudinal acceleration when braking), in the vehicle behavior to such an extent that the vehicle is prevented from tipping over.

In this case, in one advantageous refinement of the invention, one or more of the operating speed, starting and braking acceleration, and driving speed, which can be achieved or are achieved, can each be reduced by the control device, depending on the driving and load state determined, in a first intervention range in which a limiting lifting height is exceeded and a limiting driving speed is undershot and, in a second intervention range in which the limiting lifting height is undershot and the limiting driving speed is exceeded, the steering-wheel torque is increased and/or the steering transmission ratio is altered and/or the driving speed and operating speed, which can be achieved or are achieved, can each be reduced, depending on the driving and load state determined.

The first intervention range thus represents the range of static tipping or the range of quasi-static tipping in which the industrial truck is at a standstill or has only a relatively low driving speed but the lifting height is relatively high. In this first intervention range, depending on the driving and load state, the operating speed of the load-lifting device, the starting and braking acceleration, and the driving speed of the industrial truck are affected, with the effect of a limitation of the actual values which can be achieved or, in an extreme case, with the effect of the actual values already achieved being reduced.

This can be achieved, for example, by reducing the desired values predetermined by the operator (overriding the desired values predetermined by the operator by corrections from the control device). This reduces the actual values ("which can be achieved") which correspond thereto during normal operation if control levers or other operating members are deflected in a certain way. In the individual case, this may mean, for example, that, when the industrial truck is at a standstill, the operator wishes to tilt the lifted load forward at a specific speed by actuating a control lever but the tilting speed is reduced to zero by the control device owing to an impermissibly high risk of tipping, i.e., the forward tilting movement is completely prevented.

However, it is also possible to reduce already existing ("achieved") actual values by using the control device. For example, when an industrial truck is starting to reverse and the operator wishes to lift the load, the control device allows the lifting operation (possibly at a reduced lifting speed) but reduces the starting acceleration and/or driving speed already achieved.

The operating speed of the load-lifting device is primarily understood to mean the lifting and tilting speed. The lowering speed is also preferably included. Of course, further movements of the load-lifting device may also be taken into consideration, for example, the movement of a side loader or a pivoting apparatus.

In the second intervention range of the control device, namely the range of dynamic tipping, in which the industrial truck has already exceeded a specific driving speed with the load lowered, the control device intervenes, for example so as to reduce the steering speed and, in the process, may alter the steering transmission ratio. In addition, the steering-wheel torque which is required to rotate the steering wheel may alternatively or additionally be increased. Furthermore, likewise, alternatively, or additionally, the driving speed and operating speed which can be achieved or are achieved can be reduced.

With the industrial truck designed according to the invention, primarily tipping accidents are prevented which result from excessively large, rapid, or abrupt adjustment commands by the operator (first intervention range) and are caused by cornering at excessive speed with or without a load (second intervention range).

In this case, four possible operating ranges for the industrial truck are, in principle, assumed.

In a first operating range with a low lifting height, low center of gravity for the load, and low driving speed, the control device does not carry out any corrective interventions in the vehicle behavior since this range is not considered to be critical.

A second operating range is produced at a low driving speed and when a specific lifting height (limiting lifting height) is exceeded. This operating range corresponds to the first intervention range which has already been described, in which the control device influences the drive systems of the industrial truck so as to increase the tipping stability, depending on the driving and load state.

A third operating range is defined by a low lifting height (lower than the limiting lifting height) and a higher driving speed (a limiting driving speed being exceeded). This operating range is the second intervention range which has, likewise, already been described, in which the dynamic tipping stability is increased by interventions from the control device, for example, in the steering transmission ratio.

Operation of the industrial truck in a fourth operating range at a high driving speed and a high lifting height may be prevented by one of the two intervention ranges necessarily being passed through in advance and, in the process, the vehicle being brought into a state which is secure against tipping or remains in a state which maintains a specific tipping stability. The two intervention ranges are thus not left in the direction of the fourth operation range.

If the industrial truck is initially in the first intervention range, then it is necessarily held in a secure (stable against tipping) state by the reduction in the starting acceleration and the maximum driving speed which can be achieved. If the vehicle, on the other hand, is initially in the second intervention range (third operating range), the lifting of the load is limited and, as a result, operation of the industrial truck in the fourth operating range is, likewise, made impossible. Here, too, the vehicle thus remains in a state which is stable against tipping.

It will be mentioned only for the sake of completeness that, against the background of the relevant statutory regulations, no technical interventions per se would be required which, given a high driving speed, prevent a (heavy) load from being lifted above a specific lifting height since this would constitute a so-called "unintended use" of the industrial truck, i.e., an obvious misuse by the operator, which is not the responsibility of the manufacturer of the industrial truck.

It goes without saying that the transitions between the above-described operating ranges may be fluid, i.e., that the limiting driving speed and/or the limiting lifting height is/are not fixed but may assume different values.

In accordance with one advantageous development of the invention, in the first intervention range, the starting and braking acceleration and driving speed, which can be achieved or are achieved, can preferably be reduced, and, in the second intervention range, the operating speed of the load-lifting device, which can be achieved or is achieved, can preferably be reduced. Prioritization therefore takes place, in the first intervention range (static and/or quasi-static tipping), in which primarily the operating drive of the load-lifting device is used, the traction drive is influenced so as to increase the tipping stability and, in the second intervention range (dynamic tipping), in which the use of the traction drive and the steering drive predominates, the measures increasing the tipping stability affect the operating drive.

In one refinement of the invention, for the first intervention range, directly or indirectly acting sensors are provided for the purpose of detecting the lifting load, the lifting height, the tilting angle, the load torque, the direction of travel, the driving speed, and the steering angle, and, for the second intervention range, in addition directly or indirectly acting sensors are provided for the purpose of detecting the longitudinal acceleration, the transverse acceleration, and the yaw rate. The steering speed may also be derived from the signal from the steering angle.

Some of these sensors (for example, the tilting angle sensor, the lifting height sensor) are frequently already provided in generic industrial trucks as standard or special equipment, with the result that the expenditure required for implementing the invention is relatively low. This also applies to the signal paths between the control device and the drive systems of the industrial truck. The tilting angle sensor can, depending on the embodiment of the industrial truck, detect the tilting angle of the lifting mast or, given a fixed lifting mast, the tilting angle of the height-adjustable load carriage on the lifting mast.

The vehicle-specific information stored in the control device at least expediently comprises data on the dimensions and the weights of the industrial truck and the load-lifting device (lifting mast), on the tire characteristics and on the maximum load.

Using the vehicle-specific information available and the physical variables detected by the sensors, the driving and load state is determined in the control device, at least the following driving maneuvers which are critical to tipping being monitored to ascertain whether interventions are required: braking whilst travelling forward with the vehicle being inclined forward, accelerating whilst reversing with the vehicle being inclined forward, braking out of reverse travel on a bend with the vehicle being inclined perpendicular to the tipping axis, and accelerating forward on a bend with the vehicle being inclined perpendicular to the tipping axis.

The term "vehicle being inclined" shall include a relatively small inclination of the vehicle with reference to the plane. A vehicle is inclined if the vehicle is located on a slope (gradient, e.g., even less than 3%).

BRIEF DESCRIPTION OF THE DRAWINGS

Further advantages and details of the invention are explained in more detail with reference to the exemplary embodiment illustrated in the schematic figures, in which like reference numbers identify like parts throughout.

DESCRIPTION OF THE PREFERRED EMBODIMENTS

Figure 1:
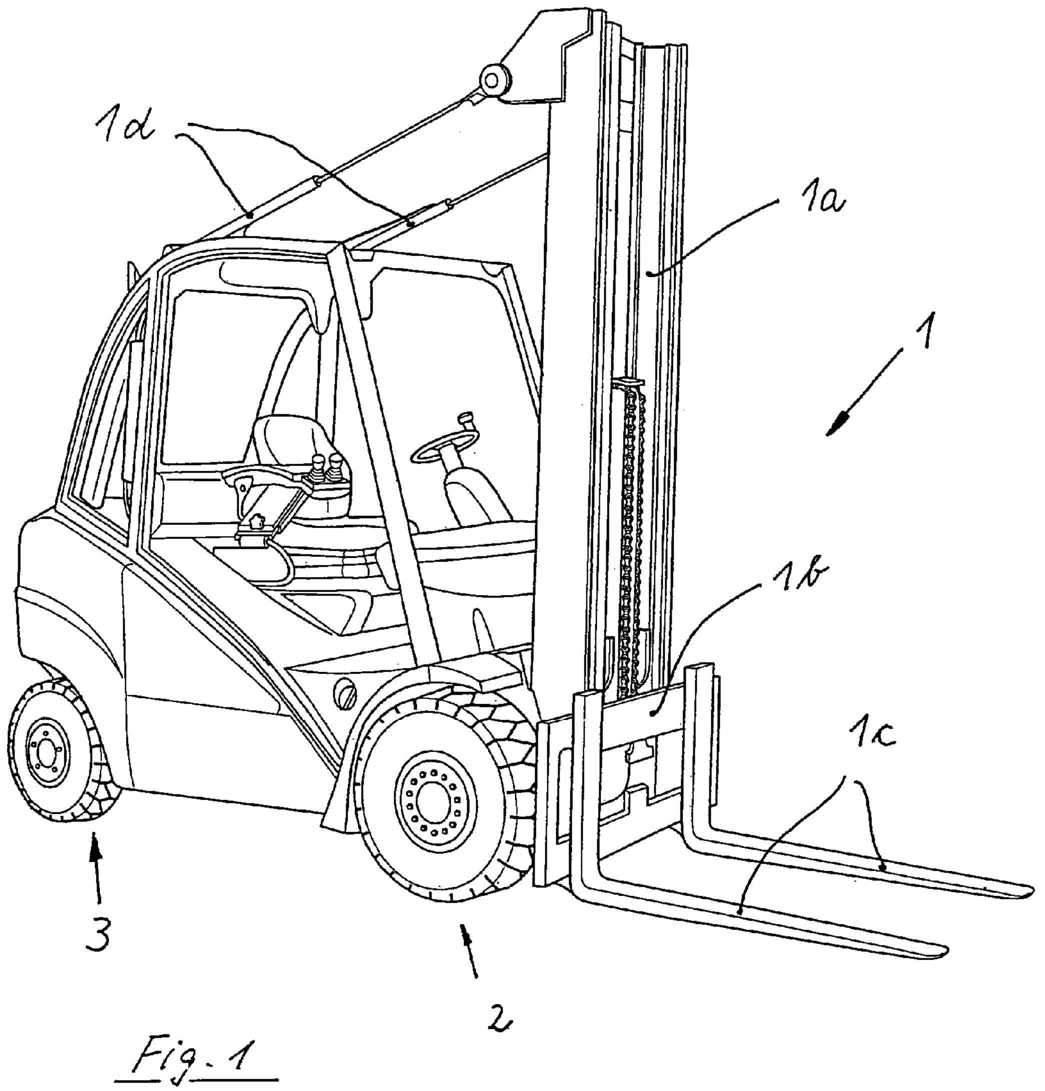
FIG. 1 shows a perspective illustration of an industrial truck.

The industrial truck shown in FIG. 1 is in the form of a forward-control counterweight fork-lift truck. A load-lifting device 1 arranged on the vehicle front side is formed by an extendable lifting mast 1*a* and a height-adjustable load carriage 1*b* on the lifting mast 1*a* having fork prongs 1*c* suspended in said load carriage 1*b*. With the aid of the fork prongs 1*c*, load goods of a variety of types can be lifted and transported.

The lifting mast 1*a* can be tilted about a horizontal axis arranged transversely in the lower region. Of course, it is also possible for a rigid, i.e., non-tiltable, lifting mast to be provided and, instead, the load carriage to be designed such that it is not only height-adjustable but is also tiltable, as is often the case, for example, with so-called warehousing devices (for example, reach trucks). Other load-receiving devices may also be fixed to the load carriage 1*b*, depending on the intended use. It goes without saying that, in principle, additional movements of the load-lifting device are also possible as long as the devices required for this purpose, for example a side loader, are available.

The lifting mast 1*a* can be tilted by means of hydraulic tilting cylinders 1*d*. The lifting mast 1*a* is extended and the load carriage 1*b* lifted by means of hydraulic lifting cylinders, possibly additionally having one or more load chains. The dead weight of the load carriage and the components of the lifting mast which are extended upwards and, if necessary, the weight of the load goods serve to lower the load carriage 1*b* or to retract the lifting mast 1*a*. Said hydraulic consumers are fed by a hydraulic pump. Together with the hydraulic valves required and a motor driving the pump, this system thus comprises a plurality of operating drives for the lifting, lowering, and tilting movement of the load-lifting device.

The fork-lift truck in accordance with the exemplary embodiment also has a traction drive, in which a front axle 2 is in the form of a drive axle, and a steering drive, with the aid of which a steering axle 3 arranged at the rear is actuated.

Figure 2:
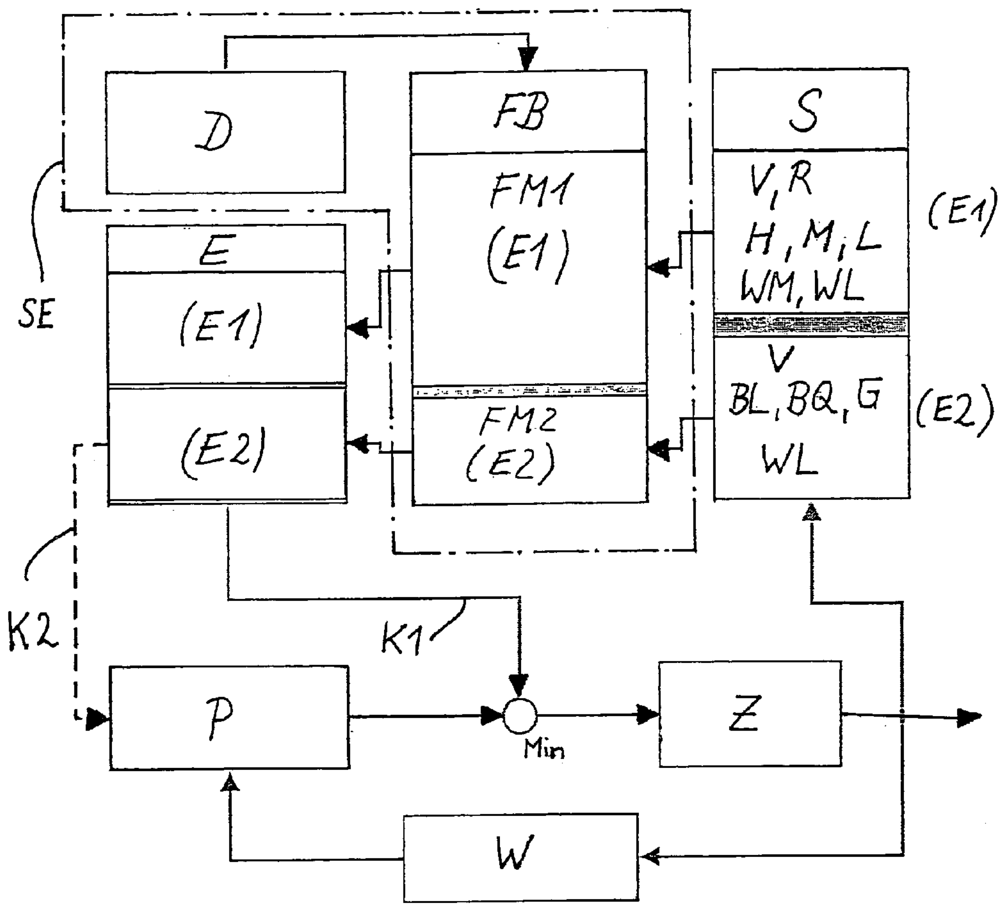
FIG. 2 shows a control structure of the invention.

FIG. 2 shows the control structure of the industrial truck according to the invention. A driving and load state Z results from the inputs P, originating from the operator, to the driving pedals, the steering wheel, and the operating levers, and this driving and load state Z is fed back to the operator in the form of a subjective observation W, on the basis of which the inputs P are altered, if necessary.

The fork-lift truck is equipped with sensors S, with the aid of which physical variables can be detected from which the driving and load state Z can be determined objectively. These variables include the lifting load L, the lifting height H, the load torque M, the mast tilting angle WM, the steering angle WL applied to the steering axle, the direction of travel R, the driving speed V, the longitudinal acceleration BL, the transverse acceleration BQ, and the yaw rate G. For example, the tilting cylinder forces or the axle load on the steering axle (rear axle) can be used to determine the load torque M. The lifting load L can be determined from the lifting cylinder forces.

Some of said sensors S are provided for the purpose of detecting the physical variables which are required for determining static and quasi-static tipping risks. These sensors are the sensors for detecting the direction of travel R, the driving speed V, the lifting load L, the lifting height H, the load torque M, the mast tilting angle WM, and the steering angle WL applied to the steering axle. Additional physical variables need to be detected for the purpose of determining dynamic tipping risks. For this purpose, sensors are provided for the purpose of detecting the longitudinal acceleration BL, the transverse acceleration BQ, and the yaw rate G.

The measured values detected by the sensors S are passed on to a control device SE in which, on the basis of vehicle-specific data, such as the dimensions and weights of the industrial truck and of the lifting mast, the tire characteristics and the maximum possible load, a calculation model D for the fork-lift truck is stored.

In the control device SE, the current driving and load state Z of the industrial truck is determined in a driving-state observer FB from the calculation model D and the measured values from the sensors S, and, in the process, it is established whether the operating and/or driving movements are critical to tipping and, therefore, make interventions necessary.

In this case, critical driving maneuvers FM1 and FM2, respectively, are monitored by the driving-state observer FB for a first intervention range E1 and for a second intervention range E2. For the first intervention range E1, in which, if possible, measures should be taken against static and/or quasi-static tipping, these critical driving maneuvers are as follows: braking whilst travelling forward with the vehicle being inclined forward, accelerating whilst reversing with the vehicle being inclined forward, braking out of reverse travel on a bend with the vehicle being inclined perpendicular to the tipping axis, and accelerating forward on a bend with the vehicle being inclined perpendicular to the tipping axis.

For the second intervention range E2, in which measures should be taken against dynamic tipping, the steering speed, for example, may be monitored as the critical driving maneuver FM2. From this, it is possible to derive the interventions E in the traction drive, the steering drive, and the operating drive which may be necessary and which lead to the tipping limits not being reached or being exceeded. The control device SE thus has the effect of increasing the tipping stability.

The interventions carried out are interventions in the intervention range E1 (for example, reduction of the driving and operating speed) and interventions in the intervention range E2 (for example, reduction of the driving speed, alteration of the steering transmission ratio for the purpose of reducing the steering speed), with which, in each case, the inputs P by the operator are corrected (connection K1), for example by overriding the desired values. They may also be interventions, by means of which the inputs P are influenced at the time they are produced (arrow K2), for example an increase in the steering-wheel torque required for rotating the steering wheel in the second intervention range E2.

Figure 3:
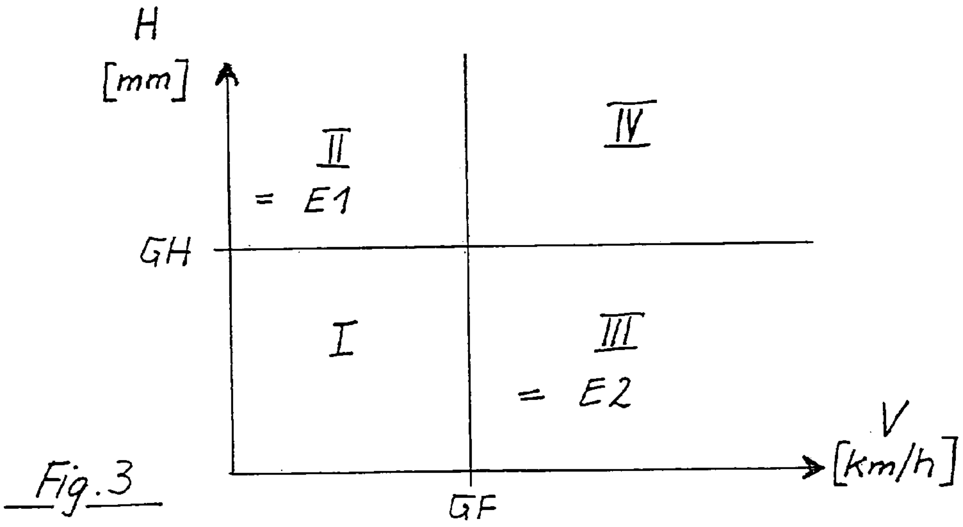
FIG. 3 shows a state diagram.

The state diagram illustrated in FIG. 3, in which the driving speed is plotted in km/h on the horizontal axis and the lifting height is plotted in mm on the vertical axis, shows four operating ranges I, II, III, and IV. In this case, a first operating range I starting from the coordinate origin is defined by a limiting lifting height GH (which is, for example, in a range between 330 and 600 mm) and a limiting driving speed GF (which is, for example, in a range between 1 and 4 km/h). Whilst maintaining the limiting driving speed GF, adjoining at the top is an operating range II, in which the lifting height is greater than the limiting lifting height GH. To the right of operating range I, i.e., when the limiting driving speed GF is exceeded, there is a third operating range III below the limiting lifting height GH. There remains a fourth operating range IV, in which both the limiting driving speed GF and the limiting lifting height GH are exceeded.

Operating range I represents that range in which the risk of tipping accidents is at its lowest. It is, therefore, not necessary in operating range I for the control device to intervene so as to increase the tipping stability.

In operating range II, i.e., the range having the high lifting height but low driving speed, there is the risk of static or quasi-static tipping, depending, inter alia, on the lifting load and the load torque. Operating range II, therefore, represents the first intervention range E1 of the control device, in which, depending on the driving and load state determined, there is a reducing effect on the operating speed of the load-lifting device, starting and braking acceleration, and/or driving speed of the industrial truck, which can be achieved or are achieved. In the process, excessively large, rapid or abrupt adjustment commands by the operator are overridden and, as a result, the tipping stability is increased.

In this case, the degree and the extent of the intervention may depend on whether only driving maneuvers when travelling straight ahead are present, i.e., no or only a small steering angle (or low steering speed) is detected, or quasi-static cornering is present in the case of which, for example, a steering angle of more than 5 degrees is detected or the steering speed exceeds a determined value.

A transition from operating range II to operating range IV is ruled out by the driving speed being limited depending on the state.

In operating range III, in which the lifting height is relatively low and the driving speed is high, there is, in addition, a dynamic risk of tipping, namely, for example, when cornering (with or without a load). Operating range III, therefore, represents the second intervention range E2 of the control device. In this case, the industrial truck is prevented from tipping over, for example in the event of rapid changes to the steering angle or when cornering at excessive speed, by the control device, for example depending on the steering angle and the yaw rate, limiting the steering speed, and/or increasing the steering-wheel torque. Here, too, it is alternatively or additionally possible to limit the driving speed and operating speed which can be achieved or are achieved.

In order to prevent the industrial truck passing from operating range III to operating range IV in which there is a severe risk of tipping (high lifting height, high driving speed), the lifting of the load can be limited or prevented.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:

a liftable and tiltable load-lifting device;

a traction drive;

operating drives for movement of the load-lifting device;

a steering drive;

a control device, wherein a calculation model based on vehicle-specific information for at least one of static, quasi-static, and dynamic tipping behavior of the industrial truck is stored in the control device; and a plurality of sensors connected to the control device for detecting physical variables relevant to at least one of the static, quasi-static, and dynamic tipping behavior of the industrial truck, wherein the control device is designed to determine a driving and load state based on the detected physical variables and the stored calculation model and is operatively connected to the traction drive, the operating drives, and the steering drive such that, depending on the driving and load state determined, corrective interventions to maintain or increase the tipping stability are carried out, and wherein in the control device, at least the following driving maneuvers which are critical to tipping are monitored: braking whilst travelling forward with the vehicle being inclined forward, accelerating whilst reversing with the vehicle being inclined forward, braking out of reverse travel on a bend with the vehicle being inclined perpendicular to a tipping axis, and accelerating forward on a bend with the vehicle being inclined perpendicular to the tipping axis.

2. The industrial truck according to claim 1, wherein the vehicle-specific information contained in the control device at least comprises data on dimensions and the weights of the industrial truck and the load-lifting device, on tire characteristics and on the load.

3. An industrial truck, comprising:

a liftable and tiltable load-lifting device;

a traction drive;

operating drives for movement of the load-lifting device;

a steering drive;

a control device, wherein a calculation model based on vehicle-specific information for at least one of static, quasi-static, and dynamic tipping behavior of the industrial truck is stored in the control device; and a plurality of sensors connected to the control device for detecting physical variables relevant to at least one of the static, quasi-static, and dynamic tipping behavior of the industrial truck, wherein the control device is designed to determine a driving and load state based on the detected physical variables and the stored calculation model and is operatively connected to the traction drive, the operating drives, and the steering drive such that, depending on the driving and load state determined, corrective interventions to maintain or increase the tipping stability are carried out, wherein in a first intervention range in which a limiting lifting height is exceeded and a limiting driving speed is undershot, at least one of an operating speed, starting and braking acceleration, and driving speed that can be achieved or are achieved are reduced by the control device depending on the driving and load state determined, and, in a second intervention range in which the limiting lifting height is undershot and the limiting driving speed is exceeded, at least one of steering-wheel torque is increased, a steering transmission ratio is altered, or the driving speed and operating speed, that can be achieved or are achieved, are reduced depending on the driving and load state determined.

4. The industrial truck according to claim 3, wherein in the first intervention range, the starting and braking acceleration and the driving speed that can be achieved or are achieved are reduced, and, in the second intervention range, the operating speed of the load-lifting device that can be achieved or is achieved is reduced.

5. The industrial truck according to claim 4, wherein for the first intervention range, directly or indirectly acting sensors are provided for detecting lifting load, lifting height, tilting angle, load torque, direction of travel, driving speed, and steering angle, and, for the second intervention range, in addition directly or indirectly acting sensors are provided for detecting longitudinal acceleration, transverse acceleration, and yaw rate.

6. The industrial truck according to claim 5, wherein in the control device, at least the following driving maneuvers which are critical to tipping are monitored: braking whilst travelling forward with the vehicle being inclined forward, accelerating whilst reversing with the vehicle being inclined forward, braking out of reverse travel on a bend with the vehicle being inclined perpendicular to a tipping axis, and accelerating forward on a bend with the vehicle being inclined perpendicular to the tipping axis.

7. The industrial truck according to claim 4, wherein the vehicle-specific information contained in the control device at least comprises data on dimensions and the weights of the industrial truck and the load-lifting device, on tire characteristics and on the load.

8. The industrial truck according to claim 4, wherein in the control device, at least the following driving maneuvers which are critical to tipping are monitored: braking whilst travelling forward with the vehicle being inclined forward, accelerating whilst reversing with the vehicle being inclined forward, braking out of reverse travel on a bend with the vehicle being inclined perpendicular to a tipping axis, and accelerating forward on a bend with the vehicle being inclined perpendicular to the tipping axis.

9. The industrial truck according to claim 3, wherein for the first intervention range, directly or indirectly acting sensors are provided for detecting lifting load, lifting height, tilting angle, load torque, direction of travel, driving speed, and steering angle, and, for the second intervention range, in addition directly or indirectly acting sensors are provided for detecting longitudinal acceleration, transverse acceleration, and yaw rate.

10. The industrial truck according to claim 9, wherein the vehicle-specific information contained in the control device at least comprises data on dimensions and the weights of the industrial truck and the load-lifting device, on tire characteristics and on the load.

11. The industrial truck according to claim 9, wherein in the control device, at least the following driving maneuvers which are critical to tipping are monitored: braking whilst travelling forward with the vehicle being inclined forward, accelerating whilst reversing with the vehicle being inclined forward, braking out of reverse travel on a bend with the vehicle being inclined perpendicular to a tipping axis, and accelerating forward on a bend with the vehicle being inclined perpendicular to the tipping axis.

12. The industrial truck according to claim 3, wherein the vehicle-specific information contained in the control device at least comprises data on dimensions and the weights of the industrial truck and the load-lifting device, on tire characteristics and on the load.

13. The industrial truck according to claim 3, wherein in the control device, at least the following driving maneuvers which are critical to tipping are monitored: braking whilst travelling forward with the vehicle being inclined forward, accelerating whilst reversing with the vehicle being inclined forward, braking out of reverse travel on a bend with the vehicle being inclined perpendicular to a tipping axis, and accelerating forward on a bend with the vehicle being inclined perpendicular to the tipping axis.

* * * * *